(No Model.)
J. R. OWEN.
COMBINED COTTON PLANTER AND FERTILIZER DISTRIBUTER.
No. 265,134. Patented Sept. 26, 1882.
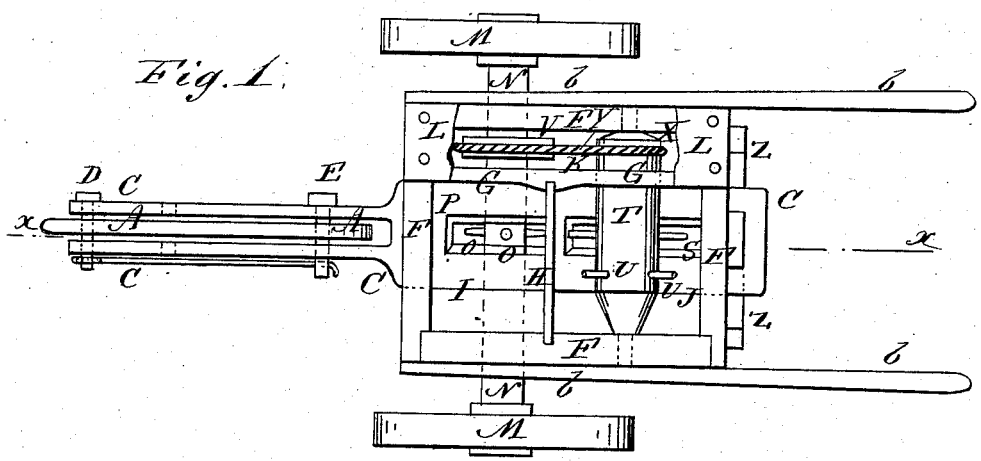
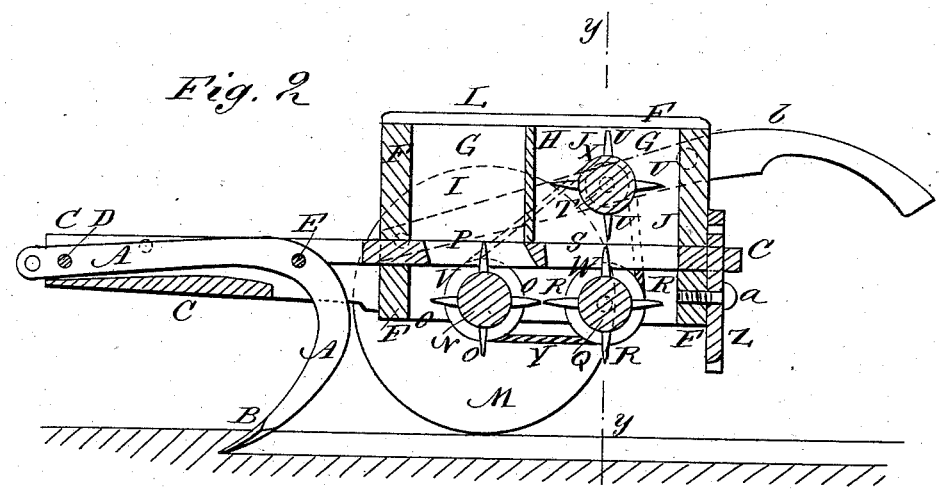
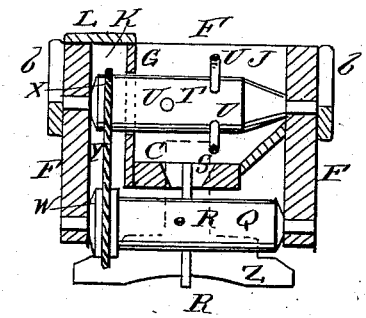
WITNESSES:
C. Neveux
C. Sedgwick
INVENTOR:
J. R. Owen
BY Munn & Co
ATTORNEYS.

UNITED STATES PATENT OFFICE.

JOHN R. OWEN, OF PULASKI, TENNESSEE.

COMBINED COTTON-PLANTER AND FERTILIZER-DISTRIBUTER.

SPECIFICATION forming part of Letters Patent No. 265,134, dated September 26, 1882.

Application filed May 17, 1882. (No model.)

*To all whom it may concern:*

Be it known that I, JOHN RICKMAN OWEN, of Pulaski, in the county of Giles and State of Tennessee, have invented a new and useful Improvement in Combined Cotton-Planter and Fertilizer-Distributer, of which the following is a full, clear, and exact description.

Reference is to be had to the accompanying drawings, forming a part of this specification, in which similar letters of reference indicate corresponding parts in all the figures.

Figure 1 is a plan view of my improvement, part being broken away. Fig. 2 is a sectional side elevation of the same, taken through the line *x x*, Fig. 1. Fig. 3 is a sectional front elevation of the same, taken through the line *y y*, Fig. 2.

The object of this invention is to facilitate the planting of cotton-seed and the distribution of a fine fertilizer in connection therewith.

The invention consists in a combined cotton-planter and fertilizer-distributer constructed with an opening-plow connected with the seed-box by a grooved and slotted bar, which serves as a bottom to the said seed-box. The seed-box is supported upon wheels, and is provided with three cylinders having radial arms and with pulleys connected by an endless belt, whereby the said cylinders will be operated and the fertilizer and cotton-seed removed from the said box by the advance of the machine. The machine is provided with a coverer, which also serves as a fastener to keep the seed-box and slotted bar in connection, as will be hereinafter fully described.

A is a plow-beam, the rear part of which is curved downward to serve as a standard, and has a plow, B, attached to its lower end to open a furrow to receive the seed and fertilizer. Upon the forward end of the beam A is formed, or to it is attached, an eye, hook, or clevis, to receive the draft. The forward part of the beam A is placed in a groove in the upper side of the forward part of the bar C, the bent rear part of the said beam passing down through a slot in the said bar.

D is a pin which passes through the forward ends of the beam A and bar C, so that the bar C and its attachments will be drawn from the beam A. The bar C and beam A are further connected by a second pin, E, which passes through a hole in the bar C and through or above the beam A, so as to hold the plow B down to its work. Several holes may be formed in the bar C to receive the pin E, so that the plow can be made to work deeper or shallower in the ground by adjusting the said pin E. The rear part of the bar C passes through the front and rear ends of the box F, and is widened to serve as a bottom to the cotton-seed and fertilizer compartments of the said box F. The box F is divided by two partitions, G H, into three compartments—a forward compartment, I, to receive guano or other fine fertilizer; a rear compartment, J, to receive the cotton-seed, and a side compartment, K, to receive the driving-gearing. The side compartment, K, is provided with a cover, L, to inclose and protect the driving-gearing.

M are the wheels, which are attached to the ends of the cylinder N, so as to carry the said cylinder N with them in their revolution. The cylinder N revolves in bearings in the forward part of the sides of the box F, and below the bar C, and to its middle part are attached radial arms O, which project through a slot, P, in the bar C, so as to withdraw the fertilizer from the compartment I and drop it into the furrow opened by the plow B.

To the rear parts of the sides of the box F, below the bar C, is pivoted the cylinder Q, to the middle part of which are attached radial arms R to project through a slot, S, in the bar C and withdraw the cotton-seeds from the compartment J and drop them into the furrow opened by the plow B.

To the upper rear part of the sides of the box F is pivoted a cylinder, T, which is provided with radial arms U, to keep the cotton-seeds stirred up, so that they will be readily drawn out by the arms R of the cylinder Q.

To the cylinders N Q T, within the side compartment, K, are attached respectively, or upon them are formed, pulleys V W X, around which passes an endless belt, Y, so that all the said cylinders will be driven from the wheels M.

The rear end of the bar C projects at the rear end of the box F, and has a cross-slot formed in it to receive the upper end or shank of the coverer Z, the lower edge of which is concaved to properly round off the top of the ridge. The coverer Z is secured in place by a screw, a, which passes through it and into the rear end of the box F.

The machine is guided and controlled by the handles b, the forward parts of which are attached to the sides of the box F.

With this construction, as the machine is drawn forward, the fertilizer and cotton-seed will be withdrawn from the box by the armed cylinders in uniform quantities and dropped to the ground.

Having thus described my invention, I claim as new and desire to secure by Letters Patent—

1. A combined cotton-planter and fertilizer-distributer, constructed substantially as herein shown and described, and consisting of the opening-plow A B, the grooved and slotted bar C, the seed-box F, divided into three compartments, I J K, by two partitions, G H, the wheels M, the three cylinders N Q T, having radial arms O R U and pulleys V W X, the endless belt Y, and the coverer Z, as set forth.

2. In a combined cotton-planter and fertilizer-distributer, the combination, with the opening-plow A B and the seed-box F, of the grooved and slotted bar C, substantially as herein shown and described, to connect the said plow and seed-box and serve as a bottom to the seed-box, as set forth.

3. In a combined cotton-planter and fertilizer-distributer, the combination, with the seed-box F, the wheels M, and the slotted bar C, of the three cylinders N Q T, having radial arms O R U and pulleys V W X, and the endless belt Y, substantially as herein shown and described, whereby the fertilizer and cotton-seeds are removed from the box and dropped to the ground in uniform quantities, as set forth.

4. In a combined cotton-planter and fertilizer-distributer, the combination, with the seed-box F, opening-plow A B, and the coverer Z, of the bar C, having a grooved front portion for the reception of the plow-standard and a slot for the downward passage through it of the plow-standard, while its rear end is adapted to support the coverer, as shown and described.

JOHN RICKMAN × OWEN.
his    mark

Witnesses:
N. SMITHSON,
WM. MALONE.